(12) United States Patent  
Feng (10) Patent No.: US 11,082,943 B2
(45) Date of Patent: *Aug. 3, 2021

(54) METHOD AND DEVICE FOR CONTROLLING DETACHMENT OF MOBILE TERMINAL

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,644

(22) Filed: Sep. 19, 2019

(65) Prior Publication Data

US 2020/0015186 A1 Jan. 9, 2020

Related U.S. Application Data

(63) Continuation of application No. 15/772,460, filed as application No. PCT/CN2016/071931 on Jan. 25, 2016, now Pat. No. 10,470,151.

(51) Int. Cl.
*H04W 60/06* (2009.01)
*H04W 76/30* (2018.01)
*H04W 76/38* (2018.01)

(52) U.S. Cl.
CPC ........... *H04W 60/06* (2013.01); *H04W 76/30* (2018.02); *H04W 76/38* (2018.02)

(58) Field of Classification Search
CPC ...... H04W 60/06; H04W 76/30; H04W 76/38
See application file for complete search history.

(56) References Cited

U.S. PATENT DOCUMENTS 6,385,469 B1 * 5/2002 Alperovich ....... H04W 52/0235
455/574
6,778,836 B2 8/2004 Kawakami
(Continued)

FOREIGN PATENT DOCUMENTS

CN 101873567 A 10/2010
CN 102355706 A 2/2012
(Continued)

OTHER PUBLICATIONS

First Office Action of the European application No. 16886846.1, dated Apr. 20, 2020.
(Continued)

*Primary Examiner* — Qun Shen
(74) *Attorney, Agent, or Firm* — Ladas & Parry, LLP (57) ABSTRACT

A method and device for a mobile terminal detaching are provided. The method comprises: upon deactivation, a mobile terminal starts a first timer, sends to a network apparatus deactivation indication information used to indicate that the mobile terminal is deactivated and keeps a registration state which is the same as the state that the mobile terminal was in before powering-off without performing a detach operation, such that the network apparatus starts a second timer to time synchronously with the first timer; and upon expiration of the first timer, the mobile terminal performs detachment operation if the mobile terminal is not reactivated.

20 Claims, 2 Drawing Sheets

(56) References Cited

U.S. PATENT DOCUMENTS

| | | | |
|---|---|---|---|
| 7,398,089 | B2 | 7/2008 | Gunaratnam |
| 7,769,380 | B2* | 8/2010 | Abu-Amara ............ H04W 8/06 |
| | | | 455/435.1 |
| 8,099,110 | B2 | 1/2012 | Kodali |
| 8,868,035 | B2 | 10/2014 | Tiwari |
| 9,226,256 | B2 | 12/2015 | Velev |
| 2012/0171993 | A1* | 7/2012 | Tiwari ................. H04W 48/02 |
| | | | 455/410 |
| 2013/0012201 | A1 | 1/2013 | Kim |
| 2013/0077579 | A1* | 3/2013 | Cho ........................ H04W 4/20 |
| | | | 370/329 |
| 2014/0003348 | A1* | 1/2014 | Velev .................... H04W 60/06 |
| | | | 370/328 |
| 2014/0044030 | A1* | 2/2014 | Ramachandran ........................... |
| | | | H04W 52/0235 |
| | | | 370/311 |
| 2014/0341124 | A1 | 11/2014 | Ronneke et al. |
| 2016/0057795 | A1 | 2/2016 | Kim et al. |
| 2016/0286491 | A1* | 9/2016 | Haneji .............. H04W 52/0216 |
| 2017/0208640 | A1 | 7/2017 | Kim et al. |
| 2017/0339644 | A1* | 11/2017 | Lee ....................... H04W 8/005 |

FOREIGN PATENT DOCUMENTS

| | | |
|---|---|---|
| CN | 102740412 A | 10/2012 |
| CN | 102740418 A | 10/2012 |
| CN | 103458499 A | 12/2013 |
| CN | 103703862 A | 4/2014 |
| CN | 105099999 A | 11/2015 |
| EP | 2683183 A1 | 1/2014 |
| JP | 2014514835 A | 6/2014 |
| WO | 2013046620 A | 4/2013 |
| WO | 2014163372 A1 | 10/2014 |

OTHER PUBLICATIONS

Office Action of the Indian application No. 201817018371, dated May 28, 2020.
3GPP. "3GPP TR 23.V2X V0.1.0 (Nov. 2015)", 3rd Generation Partnership Project; Techical Specification Group Services and System Aspects; Study on Architecture Enhancements for LTE Support of V2X Services; (Release 14), Nov. 30, 2015 (Nov. 30, 2015).
International Search Report in the international application No. PCT/CN2016/071931, dated Jun. 28, 2016.
English translation of the Written Opinion of the International Search Authority in the international application No. PCT/CN2016/071931, dated Jun. 28, 2016.
Supplementary European Search Report in the European application No. 16886846.1, dated May 14, 2019.
First Office Action of Japanese application No. 2018-521639, dated Aug. 30, 2019.
Notice of Allowance of the U.S. Appl. No. 15/772,460, dated Jun. 17, 2019.
First Office Action of the Chinese application No. 201680054927.0, dated Dec. 29, 2020, with search report.
First Office Action and search report from TW App. No. 106103052, dated Dec. 30, 2019, with machine English translation.
Notice of Allowance of the Chinese application No. 201680054927.0, dated Jun. 11, 2021.

* cited by examiner

METHOD AND DEVICE FOR CONTROLLING DETACHMENT OF MOBILE TERMINAL

CROSS REFERENCE TO RELATED APPLICATIONS

This application is a continuation of U.S. application Ser. No. 15/772,460 filed on Apr. 30, 2018, which is the national phase under 35 U.S.C. § 371 of PCT International Application No. PCT/CN2016/071931, filed on Jan. 25, 2016, the entire contents of which are hereby incorporated by reference.

BACKGROUND

In an existing Long Term Evolution (LTE) technology, when a terminal in an Evolved Mobility Management (EMM)-DEREGISTERED state is expected to return to an EMM-REGISTERED state, the terminal may initiate an attach flow, and the flow is a Non-Access Stratum (NAS) flow. For example, upon the terminal starts or a Subscriber Identity Module (SIM) card is inserted into the terminal, the terminal will return to the EMM-REGISTERED state from the EMM-DEREGISTERED state, and requires the attach procedure. The attach procedure is born on an Access Stratum (AS) procedure. That is, an AS is required to complete downlink synchronization, random access and connection establishment at first, and then interaction about signaling such as an attach REQUEST, attach ACCEPT and attach COMPLETE is performed through NAS signaling.

An existing LTE system is discussing introduction of an LTE-technology-based Vehicle to X (V2X) system. Here, a mobile terminal is a running vehicle which is different from a conventional terminal such as a mobile phone or a computer. A behavior pattern of an automobile is different from an ordinary terminal. That is to say, most of automobiles run for a limited time period each day. The powering-on and powering-off frequency of an automobile is far higher than a conventional terminal. Registration/deregistration management is required to be performed on an automobile type terminal by adopting a conventional attach/detach manner every time. For example, when an owner drives an automobile to a place such as a post office, a supermarket and a shopping mall with a short stay, a detach/attach procedure is required to be performed on the automobile. In another example, the owner waits for another passenger by the roadside in the automobile with the automobile temporarily powered off, a detach/attach procedure is required to be performed on the automobile.

From the above scenarios, it can be seen that an existing attach/detach procedure may be used for an LTE-technology-based V2X system. That is, in a manner similar to that of an existing terminal, attach is performed when a vehicle is started and detach is performed when the vehicle is stopped. However, the vehicle is powered off and powered on relatively frequently. If a conventional attach/detach manner is still adopted for registration/deregistration management over a vehicle type terminal, a lot of signaling may be unnecessarily wasted. Moreover, a first starting access latency of the vehicle may be influenced.

SUMMARY

The disclosure relates to the field of communication, and more particularly, to a method and device for controlling detach of a mobile terminal.

The disclosure provides a method and device for controlling detach of a mobile terminal, which may reduce a signaling overhead and improve system efficiency.

A first aspect provides a method for controlling detach of a mobile terminal, which may include that: when the mobile terminal is powered off, a first timer is started, and powering-off indication information is sent to a network equipment, wherein the powering-off indication information indicates that the mobile terminal has been powered off such that the network equipment starts a second timer which is aligned with the first timer; and when the mobile terminal has not been powered on till the first timer expires, the mobile terminal executes a detach operation.

Therefore, according to the method for controlling detach of the mobile terminal in embodiments of the disclosure, when the mobile terminal is powered off, the timer is started, and the detach operation is temporarily not performed; if the mobile terminal is powered on again in case of no timeout of the timer, an attach operation is not required to be performed; and if the mobile terminal is not powered on again till the timeout of the timer, the mobile terminal and the network equipment may perform the detach operation in case of the timeout of the timer. In such a manner, a signaling overhead of an attach/detach flow may be effectively reduced, particularly for a service such as V2X relatively frequently executing the attach/detach operation, system efficiency may also be improved, and a first access delay of the mobile terminal may be reduced.

Optionally, the network equipment may be access network equipment, and may also be core network equipment.

In combination with the first aspect, in an implementation mode of the first aspect, the method may further include that: when the mobile terminal is powered on before the first timer expires, the mobile terminal keeps an EMM-REGISTERED state before powering-off, and sends powering-on indication information to the network equipment, wherein the powering-on indication information indicates that the mobile terminal has been powered on such that the network equipment resumes the registration state for the mobile terminal.

Specifically, the mobile terminal sends the powering-on indication information to the network equipment, and the network equipment may further delete the second timer in the network equipment according to the powering-on indication information and keep the EMM-REGISTERED state of the mobile terminal.

In combination with the first aspect and the abovementioned implementation mode thereof, in another implementation mode of the first aspect, when the mobile terminal is powered on after performing the detach operation, the method may further include that: the mobile terminal executes an attach operation.

In combination with the first aspect and the abovementioned implementation modes thereof, in another implementation mode of the first aspect, the method may further include that: the mobile terminal receives first configured time period sent by the network equipment, the first configured time period being a time period which is configured for the second timer by the network equipment; and the mobile terminal sets a time period of the first timer as the first configured time period.

Specifically, when the second timer is positioned in core network equipment, the core network equipment may send the first configured time period to the mobile terminal through access network equipment.

In combination with the first aspect and the abovementioned implementation modes thereof, in another implementation mode of the first aspect, the method may further include that: the mobile terminal receives a plurality of configured time periods sent by the network equipment; the mobile terminal sets a second configured time period of the plurality of configured time periods as the time period of the first timer; and the mobile terminal sends the second configured time period to the network equipment such that the network equipment sets a time period of the second timer as the second configured time period.

Specifically, when the second timer is positioned in core network equipment, the core network equipment may send the plurality of configured time periods to the mobile terminal through access network equipment; and the mobile terminal may further send the second configured time period to the core network equipment through the access network equipment for the core network equipment to configure the time period of the second timer as the second configured time period.

A second aspect provides a method for controlling detach of a mobile terminal, which may include that: when a network equipment receives powering-off indication information sent by the mobile terminal, a second timer is started, wherein the powering-off indication information indicates that the mobile terminal has been powered off, the second timer performs timing synchronously with timing of a first timer in the mobile terminal and the first timer is started upon the mobile terminal is powered off; and when the network equipment has not yet received powering-on indication information sent by the mobile terminal when the second timer expires, the network equipment executes a detach operation, wherein the powering-on indication information indicates that the mobile terminal has been powered on.

Therefore, according to the method for controlling detach of the mobile terminal in the embodiments of the disclosure, when the mobile terminal is powered off, the timer is started, and the detach operation is temporarily not performed; if the mobile terminal is powered on again in case of no timeout of the timer, an attach operation is not required to be performed; and if the mobile terminal is not powered on again till the timeout of the timer, the mobile terminal and the network equipment may perform the detach operation in case of the timeout of the timer. In such a manner, a signaling overhead of an attach/detach flow may be effectively reduced, particularly for a service such as V2X relatively frequently executing the attach/detach operation, system efficiency may also be improved, and a first access delay of the mobile terminal may be reduced.

It is to be understood that the network equipment may be access network equipment, and may also be core network equipment.

Optionally, when the network equipment is access network equipment, the operation that the access network equipment executes the detach operation includes that: the access network equipment sends detach indication information to core network equipment, the detach indication information being configured to indicate the core network equipment to perform the detach operation, and the core network equipment may delete context information during attach of the mobile terminal according to the detach indication information.

In combination with the second aspect, in an implementation mode of the second aspect, the method may further include that: when the network equipment receives the powering-on indication information sent by the mobile terminal before the second timer expires, the network equipment keeps an EMM-REGISTERED state before powering-off.

It is to be understood that, when the network equipment is access network equipment, the operation that the access network equipment keeps the EMM-REGISTERED state before powering-off includes that: the access network equipment does not indicate core network equipment to perform the detach operation, and the core network equipment keeps the EMM-REGISTERED state before powering-off.

In combination with the second aspect and the above-mentioned implementation mode thereof, in another implementation mode of the second aspect, the method may further include that: the network equipment sets a time period of the second timer as first configured time period; and the network equipment sends the first configured time period to the mobile terminal such that the mobile terminal sets a time period of the first timer as the first configured time period.

Optionally, when the network equipment is core network equipment, that is, the second timer is positioned in the core network equipment, the core network equipment may send the first configured time period to the mobile terminal through access network equipment.

In combination with the second aspect and the above-mentioned implementation modes thereof, in another implementation mode of the second aspect, the method may further include that: the network equipment sends a plurality of configured time periods to the mobile terminal; the network equipment receives a second configured time period of the plurality of configured time periods sent by the mobile terminal, the second configured time period being a time period which is configured for the first timer by the mobile terminal; and the network equipment sets the time period of the second timer as the second configured time period.

Specifically, when the network equipment is core network equipment, that is, the second timer is positioned in the core network equipment, the core network equipment may send the plurality of configured time periods to the mobile terminal through access network equipment; and the mobile terminal may further send the second configured time period to the core network equipment through the access network equipment for the core network equipment to configure the time period of the second timer as the second configured time period.

A third aspect provides a mobile terminal, which is configured to perform the method in the first aspect or any possible implementation mode of the first aspect. The mobile terminal specifically includes units configured to perform the method in the first aspect and any possible implementation mode of the first aspect.

A fourth aspect provides network equipment, which is configured to perform the method in the second aspect or any possible implementation mode of the second aspect. The network equipment specifically includes units configured to perform the method in the second aspect or any possible implementation mode of the second aspect.

A fifth aspect provides a mobile device, which includes: a memory and a processor, wherein the memory is configured to store an instruction, the processor is configured to perform the instruction stored in the memory, and the instruction stored in the memory is executed to enable the processor to perform the method in the first aspect or any possible implementation mode of the first aspect.

A sixth aspect provides network equipment, which includes: a memory and a processor, wherein the memory is configured to store an instruction, the processor is configured to perform the instruction stored in the memory, and the instruction stored in the memory is executed to enable the processor to perform the method in the second aspect or any possible implementation mode of the second aspect.

A seventh aspect provides a computer-readable medium, which is configured to store a computer program, the computer program including instructions configured to perform the method in the first aspect or any possible implementation mode of the first aspect.

An eighth aspect provides a computer-readable medium, which is configured to store a computer program, the computer program including instructions configured to perform the method in the second aspect or any possible implementation mode of the second aspect.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be derived by those skilled in the art according to these drawings without creative work.

DETAILED DESCRIPTION

The technical solutions in the embodiments of the disclosure will be clearly and completely described below with reference to the drawings in the embodiments of the disclosure. It is apparent that the described embodiments are not all embodiments but part of embodiments of the disclosure. All other embodiments obtained by those skilled in the art on the basis of the embodiments in the disclosure without creative work shall fall within the scope of protection of the disclosure.

Figure 1:
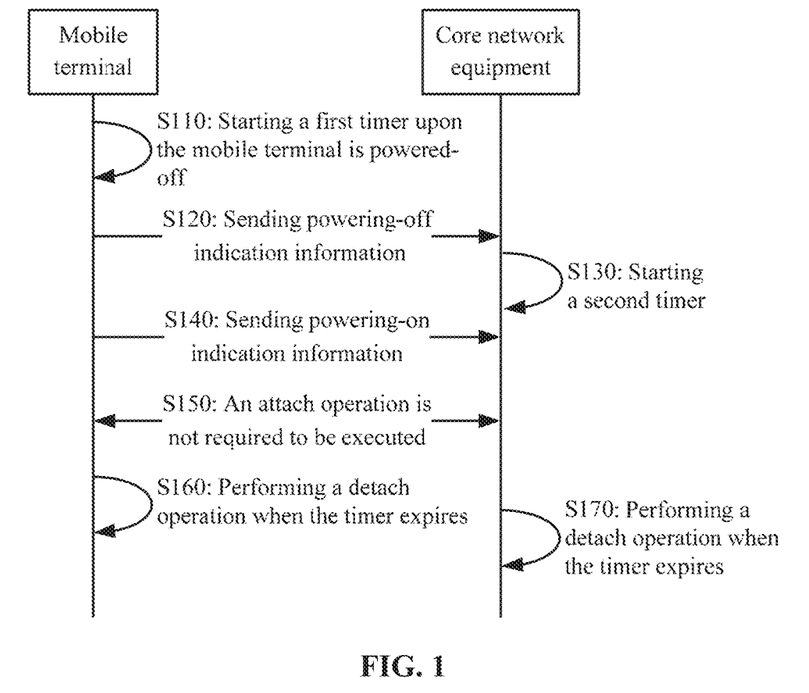
FIG. 1 is a schematic flowchart of a method for controlling detach of a mobile terminal according to an embodiment of the disclosure.

FIG. 1 is a schematic flowchart of a method 100 for controlling detach of a mobile terminal according to an embodiment of the disclosure. As illustrated in FIG. 1, the method 100 includes the following steps.

In S110, when the mobile terminal is powered off, a first timer is started. In addition, the mobile terminal may keep in an EMM-REGISTERED, before powering-off. That is, the mobile terminal temporarily does not perform a detach operation.

It is to be understood that, in the method 100, the mobile terminal may be a conventional mobile terminal, or a mobile station, or an automobile type mobile terminal, which will not form any limit to the disclosure. For example, for a V2X system, the mobile terminal may be an automobile. Compared to a conventional terminal, a powering-on/off frequency of the automobile is higher.

It is to be understood that, in the method 100, a network equipment may be core network equipment, or an access network equipment. The access network equipment may be a base station. The core network equipment may be a Mobility Management Entity (MME) or a Home Subscriber Server (HSS), which will not form any limit to the disclosure.

It is to be understood that, before the mobile terminal is powered off, that is, the mobile terminal is in an on state, the mobile terminal is in the EMM-REGISTERED state for data communication with a network. Specifically, the mobile terminal may perform data transmission with the core network equipment through access network equipment, and related context information during attach of the mobile terminal is stored in the core network equipment.

It is to be understood that the condition that the mobile terminal is powered off or the mobile terminal enters an off mode may refer to that the mobile terminal is powered off. For example, when the mobile terminal is an automobile, the condition that the mobile terminal is powered off may refer to that the automobile is powered off.

It is to be understood that a first timer may be started to perform timing for the mobile terminal when the mobile terminal is powered off, and the first timer may be maintained by the mobile terminal.

In the embodiment of the disclosure, when the mobile terminal is powered off, the mobile terminal does not perform the detach operation, but keeps the EMM-REGISTERED before powering-off. However, the mobile terminal may be disconnected from the access network equipment after being powered off.

In a conventional art, after the mobile terminal is powered off, the mobile terminal may perform the detach operation, and the mobile terminal and the core network equipment may delete the stored related context information during attach. While the difference between the embodiment of the disclosure and the conventional art is that the mobile terminal may temporarily not perform the detach operation after being powered off, that is, the terminal may not delete the related context information during an attach operation, but temporarily keeps the EMM-REGISTERED state and starts the first timer. Therefore, it may also be understood that the mobile terminal is in a temporarily off state and still keeps the EMM-REGISTERED state after being powered off.

In the embodiment of the disclosure, the first timer sets configured time period, after being started, the timer may terminate timing upon the mobile terminal is powered on again, and if the mobile terminal is not powered on again when timing of the timer exceeds the configured time period, that is, before a timeout of the timer, the first timer is also stopped upon the timer expires. Optionally, the configured time period configured in the first timer may be configured according to a practical condition, and may specifically be configured by the network equipment and notified to the mobile terminal through broadcast signaling or in another manner. For example, the configured time period may be configured to the mobile terminal by the core network equipment through dedicated information during a last detach operation. Alternatively, configuration information is transmitted to the mobile terminal through the access network equipment, and the configured time period of the first timer is configured through the configuration information.

Optionally, one or more pieces of configured time period may be configured in the first timer according to a practical condition, which is selected by a user according to the practical condition, and a specific numerical value set for the timer may be notified to the network equipment through signaling or in another manner. For example, there may be three choices for the configured time period in the timer, for example, Value1-applicable to a short stay, Value2-applicable to a medium stay and Value3-applicable to a relatively long stay. That is, when the mobile terminal may be an automobile, an owner of the automobile may select one of the three pieces of configured time period in the timer before stopping the automobile and powering off the mobile terminal. Specifically, the owner may select the configured time period according to stopping time of this time, may select Value3 indicating relatively short configured time period in the timer if a stay duration is relatively long, and may select Value1 indicating relatively long configured time period in the timer in case of a short stay, which will not form any limit to the disclosure. After the owner selects the configured time period for which the timer is used this time, the automobile terminal may send a selection result to the network equipment through signaling for the network equipment to simultaneously start a timer of the network equipment to synchronously start timing by virtue of the same configured time.

In S120, the mobile terminal sends powering-off indication information to a network equipment, wherein the powering-off indication information indicates that the mobile terminal has been powered off.

In S130, the network equipment starts a second timer of the network equipment after receiving the powering-off indication information. The second timer performs timing synchronously with the timing of the first timer of the mobile terminal after the mobile terminal is powered off.

Specifically, after receiving the powering-off indication information, the network equipment starts the second timer, may still keep the EMM-REGISTERED state before powering-off, and temporarily does not perform the detach operation. Here, the network equipment may be an access network equipment, or core network equipment. That is, the timing of the second timer may be controlled by the access network equipment, or controlled by core network equipment.

In the embodiment of the disclosure, after the mobile terminal is powered off, the network equipment is notified through dedicated signaling that the mobile terminal has been powered off. In the conventional art, after the mobile terminal is powered off, the network equipment is also notified through dedicated signaling that the mobile terminal has been powered off, the network equipment determines the mobile terminal to perform the detach operation, and the core network equipment directly deletes or the core network equipment is indicated by access network equipment to delete the related context information during attach of the mobile terminal, that is, the mobile terminal enters an EMM-DEREGISTERED state. While in the embodiment of the disclosure, when the network equipment receives the powering-off indication information indicating that the mobile terminal has been powered off, the network equipment may not determine the mobile terminal to perform the detach operation as a default, that is, the network equipment temporarily does not perform the detach operation, and the core network equipment may keep the EMM-REGISTERED state before powering-off and reserve the related context information stored in the network equipment during attach.

In the embodiment of the disclosure, the network equipment sets the second timer. The second timer performs timing synchronously with the timing of the first timer. That is, the same configured time period is configured for the first timer and the second timer. The first timer and the second timer are simultaneously started. Specifically, the first timer in the mobile terminal and the second timer in the network equipment may be configured by the network equipment in a unified manner for transmission to the mobile terminal. Optionally, the network equipment may be an access network equipment, or a core network equipment. The network equipment may configure one or more configured time periods for the first timer in the mobile terminal. When a configured value is configured, the configured time period is configured for the timers in both the mobile terminal and the network equipment. When a plurality of configured time periods are configured for the mobile terminal, the configured time period for which the first timer is used each time may be selected by the user and notified to the network equipment through signaling or in another manner for the network equipment to configure the configured time period of the second timer as the same as the time period of the first timer.

Specifically, when the network equipment configures one configured time period, which may be called as a first configured time period, the network equipment sets the first configured time period for the second timer and transmits it to the mobile terminal. For example, the first configured time period is sent to the mobile terminal through broadcast or dedicated signaling in the attach operation or the detach operation such that the mobile terminal sets the first configured time period for the first timer.

Optionally, when the network equipment configures a plurality of configured time periods, the plurality of configured time periods may be sent to the mobile terminal. The powering-off indication information may be sent to the network equipment when the mobile terminal is powered off. The powering-off indication information may be configured to indicate that the mobile terminal has been powered off. The powering-off indication information may also indicate that the configured time period selected for the first timer is a second configured time period of the plurality of configured time periods when the mobile terminal is powered off this time and the first timer is started. Then the network equipment may start the second timer according to the powering-off indication information and configure the configured time period of the second timer as the second configured time period the same as the time period of the first timer. Optionally, the terminal may further send the second configured time period to the network equipment in another manner, and there are no limits made to the disclosure.

In S140, the mobile terminal is powered on again before the first timer in the mobile terminal expires, the mobile terminal sends powering-on indication information to the network equipment. Here, the powering-on indication information indicates that the mobile terminal has been powered on. Since the second timer in the network equipment performs timing synchronously with the timing of the first timer in the mobile terminal, the second time doesn't expires upon the network equipment receives the powering-on indication information. Then, in S150, after being powered on again, the mobile terminal is not required to perform the attach operation, and may keep the EMM-REGISTERED state. That is, the core network equipment and the mobile terminal may directly use the undeleted related context during the attach operation.

In the embodiment of the disclosure, after the mobile terminal is powered off, the first timer is started. When the mobile terminal is powered on before the first timer expires, the first timer may be stopped, that is, the first timer may stop timing. Moreover, during this time period from powering-off to powering-on, the mobile terminal does not perform the detach operation, the network equipment also does not perform the detach operation, and the core network equipment reserves the related context during the attach operation for the mobile terminal. As such, the attach operation is not required to be performed when the mobile terminal is powered on again.

Similarly, the second timer is configured in the network equipment. The second timer in the network equipment is synchronized with the first timer in the mobile terminal. The second timer doesn't expires when the first timer doesn't expires. When the mobile terminal is powered on again, the network equipment may be notified through signaling or in another manner that the mobile terminal has been powered on again, such that the network equipment stops the second timer to enable the core network equipment to keep the EMM-REGISTERED state of the mobile terminal.

In S160, if the mobile terminal has yet not been powered on again when the first timer expires, the mobile terminal may perform the detach operation when the first timer has expired, that is, the related context information stored during the attach operation is deleted to enter the EMM-DEREGISTERED state.

Similarly, in S170, since the network equipment performs timing synchronously with the timing of the mobile terminal, when the mobile terminal is not powered on again when the mobile terminal expires, the network equipment cannot receive the powering-on indication information sent by the mobile terminal when the second timer expires. In such case, the network equipment also executes the detach operation. Here, the powering-on indication information indicates that the mobile terminal has been powered on again.

Specifically, when the network equipment is an access network equipment, if the powering-on indication information sent by the mobile terminal has yet not been received the second timer in the access equipment network expires, the access network equipment performs the detach operation. That is, the access network equipment may send detach indication information to a core network equipment to instruct the core network equipment to perform the detach operation through the detach indication information. And the core network equipment deletes the relevant context information of the mobile terminal during the attach operation to make the mobile terminal enter the EMM-DEREGISTERED state. Optionally, when the network equipment is a core network equipment, if the powering-on indication information sent by the mobile terminal has yet not been received when the second timer in the core network equipment expires, the core network equipment performs the detach operation, and deletes the relevant context information of the mobile terminal during the attach operation to make the mobile terminal enter the EMM-DEREGISTERED state.

In the embodiment of the disclosure, after the mobile terminal and the network equipment perform the detach operation when the timers expire and the mobile terminal is powered on again, the attach operation may be performed. Specifically, the attach operation may be the same as the attach operation in the conventional art, the mobile terminal may send attach request information to the network equipment to perform the attach operation, then the mobile terminal registers with the core network equipment to enter the EMM-REGISTERED state, and thus the mobile terminal may perform data transmission with the network equipment.

It is to be understood that, in the embodiment of the disclosure, a magnitude of a sequence number of each process does not mean an execution sequence, and the execution sequence of each process should be determined according to its function and an internal logic and should not form any limit to an implementation process of the embodiment of the disclosure.

Therefore, according to the method for controlling detach of the mobile terminal in the embodiment of the disclosure, when the mobile terminal is powered off, the timer is started, and the detach operation is temporarily not performed. If the mobile terminal is powered on again when the timer hasn't expired, an attach operation is not required to be performed. If the mobile terminal is not powered on again when the timer has expired, the mobile terminal and the network equipment may perform the detach operation when the timer has expired. In such a manner, a signaling overhead of an attach/detach flow may be effectively reduced, particularly for a service such as V2X relatively frequently executing the attach/detach operation, system efficiency may also be improved, and a first access latency of the mobile terminal may be reduced.

The method for controlling detach of the mobile terminal according to the embodiments of the disclosure has been described above with reference to FIG. 1 in detail, a device for controlling detach of the mobile terminal according to the embodiments of the disclosure will be described below by referring to FIGS. 2 to 5.

Figure 2:
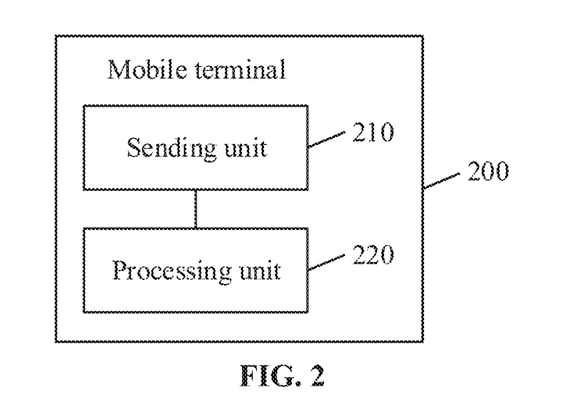
FIG. 2 is a schematic block diagram of a mobile terminal according to an embodiment of the disclosure.

As illustrated in FIG. 2, a mobile terminal 200 according to an embodiment of the disclosure includes a sending unit 210 and a processing unit 220.

The sending unit 210 is configured to, when the mobile terminal is powered off, start a first timer, and send powering-off indication information to a network equipment, wherein the powering-off indication information indicates that the mobile terminal has been powered off such that the network equipment starts a second timer which is aligned with the first timer.

The processing unit 220 is configured to, when the mobile terminal has not been powered on till the first timer expires, perform a detach operation.

Optionally, the sending unit 210 is further configured to, when the mobile terminal is powered on before the first timer expires, keep an EMM-REGISTERED state before powering-off, and send powering-on indication information to the network equipment. Here, the powering-on indication information indicates that the mobile terminal has been powered on such that the network equipment resumes the registration state for the mobile terminal.

Optionally, when the mobile terminal is powered on after performing the detach operation, the processing unit 220 is further configured to perform an attach operation.

Optionally, the mobile terminal further includes a receiving unit. The receiving unit is configured to receive a first configured time period sent by the network equipment. The first configured time period is a time period which is configured for the second timer by the network equipment. The processing unit 220 is further configured to set a time period of the first timer as the first configured time period.

Optionally, the mobile terminal further includes a receiving unit. The receiving unit is configured to receive a plurality of configured time periods sent by the network equipment. The processing unit 220 is further configured to set a second configured time period of the plurality of configured time periods as the time period of the first timer. The sending unit 210 is further configured to send the second configured time period to the network equipment, such that the network equipment sets a time period of the second timer as the second configured time period.

It is to be understood that the mobile terminal 200 according to the embodiment of the disclosure may correspond to the mobile terminal in the method 100 in the embodiment of the disclosure. The abovementioned and other operations and/or functions of each module in the mobile terminal 200 are intended to implement corresponding flows of the mobile terminal in the method in FIG. 1, and will not be elaborated herein for clarity.

Therefore, when the mobile terminal of the embodiment of the disclosure is powered off, the first timer is started, and the detach operation is temporarily not performed. If the mobile terminal is powered on again in case of no timeout of the timer, an attach operation is not required to be performed. If the mobile terminal is not powered on again when the timer has expired, the mobile terminal and the network equipment may perform the detach operation when the timer has expired. In such a manner, a signaling overhead of an attach/detach flow may be effectively reduced, particularly for a service such as V2X relatively frequently executing the attach/detach operation, system efficiency may also be improved, and a first access delay of the mobile terminal may be reduced.

Figure 3:
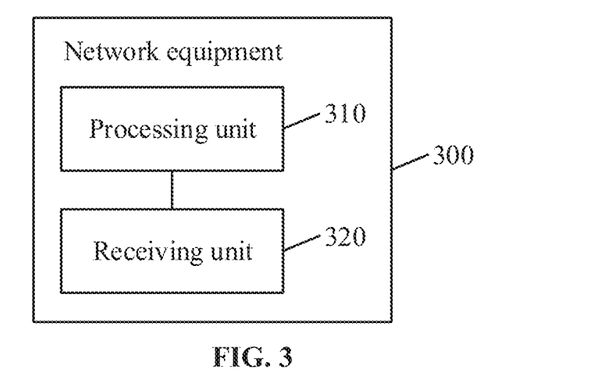
FIG. 3 is a schematic block diagram of a core network equipment according to an embodiment of the disclosure.

As illustrated in FIG. 3, network equipment 300 according to an embodiment of the disclosure includes a processing unit 310 and a receiving unit 320.

The processing unit 310 is configured to, when the receiving unit 320 receives powering-off indication information sent by a mobile terminal, start a second timer. Here, the powering-off indication information indicates that the mobile terminal has been powered off, the second timer performs timing synchronously with timing of a first timer in the mobile terminal and the first timer is started upon the mobile terminal is powered off.

The processing unit 310 is further configured to, when the receiving unit 320 has still yet not received powering-on indication information sent by the mobile terminal when the second timer expires, perform a detach operation. Here, the powering-on indication information indicates that the mobile terminal has been powered on.

Optionally, the processing unit 310 is further configured to, when the receiving unit 320 receives the powering-on indication information sent by the mobile terminal when the second timer expires, keep an EMM-REGISTERED state before powering-off.

Optionally, the processing unit 310 is further configured to set a time period of the second timer as a first configured time period. The network equipment further includes a sending unit configured to send the first configured time period to the mobile terminal, such that the mobile terminal sets a time period of the first timer as the first configured time period.

Optionally, the network equipment further includes a sending unit configured to send a plurality of configured time periods to the mobile terminal. The receiving unit 320 is further configured to receive a second configured time period of the plurality of configured time periods sent by the mobile terminal. The second configured time period is a time period which is configured for the first timer by the mobile terminal. The processing unit 310 is further configured to set the time period of the second timer as the second configured time period.

It is to be understood that the network equipment 300 according to the embodiment of the disclosure may correspond to the network equipment in the method 100 in the embodiment of the disclosure, and the abovementioned and other operations and/or functions of each module in the network equipment 300 are intended to implement corresponding flows of the mobile terminal in the method in FIG. 1, and will not be elaborated herein for clarity.

Therefore, according to the network equipment of the embodiment of the disclosure, when the mobile terminal is powered off, the first timer is started, and the detach operation is temporarily not performed. If the mobile terminal is powered on again when the timer hasn't expired, an attach operation is not required to be performed. If the mobile terminal is not powered on again when the timer expires, the mobile terminal and the network equipment may perform the detach operation when the timer expires. In such a manner, a signaling overhead of an attach/detach flow may be effectively reduced, particularly for a service such as V2X relatively frequently executing the attach/detach operation, system efficiency may also be improved, and a first access delay of the mobile terminal may be reduced.

Figure 4:
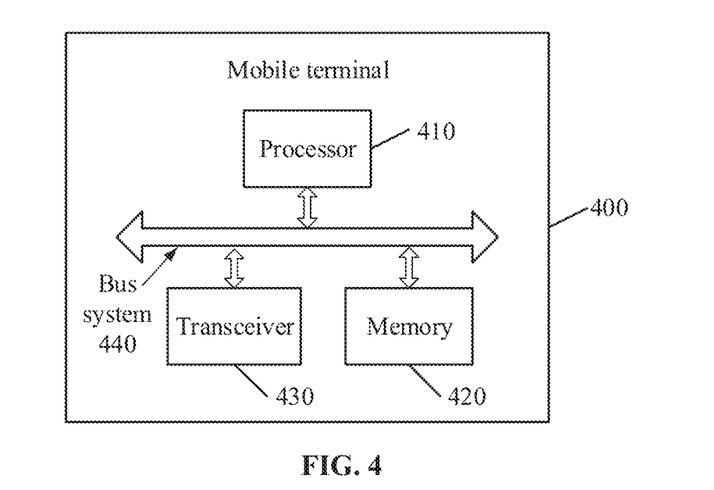
FIG. 4 is a schematic block diagram of a mobile terminal according to another embodiment of the disclosure.

As illustrated in FIG. 4, an embodiment of the disclosure further provides a mobile terminal 400, which includes a processor 410, a memory 420, a transceiver 430 and a bus system 440, wherein the processor 410, the memory 420 and the transceiver 430 are connected through the bus system 440, the memory 420 is configured to store an instruction, and the processor 410 is configured to execute the instruction stored in the memory 420 to control the transceiver 430 to receive and transmit a signal, wherein the transceiver 430 is configured to, when the mobile terminal is powered off, start a first timer, and send powering-off indication information to a network equipment, wherein the powering-off indication information indicates that the mobile terminal has been powered off, such that the network equipment starts a second timer which is aligned with the first timer; and the processor 410 is configured to, when the mobile terminal has not been powered on till the first timer expires, perform a detach operation.

Therefore, when the mobile terminal of the embodiment of the disclosure is powered off, the first timer is started, and the detach operation is temporarily not performed. If the mobile terminal is powered on again when the timer hasn't expired, an attach operation is not required to be performed. If the mobile terminal is not powered on again when the timer expires, the mobile terminal and the network equipment may perform the detach operation when the timer expires. In such a manner, a signaling overhead of an attach/detach flow may be effectively reduced, particularly for a service such as V2X relatively frequently executing the attach/detach operation, system efficiency may also be improved, and a first access delay of the mobile terminal may be reduced.

It is to be understood that, in the embodiment of the disclosure, the processor 410 may be a Central Processing Unit (CPU), and the processor 410 may also be another universal processor, a Digital Signal Processor (DSP), an Application Specific Integrated Circuit (ASIC), a Field-Programmable Gate Array (FPGA) or another programmable logic device, discrete gate or transistor logical device and discrete hardware component. The universal processor may be a microprocessor or the processor may also be any conventional processor and the like.

The memory 420 may include a Read-Only Memory (ROM) and a Random Access Memory (RAM), and provides an instruction and data for the processor 410. Part of the memory 420 may also include a nonvolatile RAM. For example, the memory 420 may further store information about an equipment type.

The bus system 440 includes a data bus, and may further include a power bus, a control bus and a state signal bus. However, for clear description, each bus in the figure is marked to be the bus system 440.

In an implementation process, each step of the method may be implemented by an integrated logic circuit of hardware in the processor 410 or an instruction in a software form. The steps of the method disclosed in combination with the embodiment of the disclosure may be directly embodied to be performed and implemented by a hardware processor or executed and implemented by combining hardware and software modules in the processor. The software module may be located in a mature storage medium in this field such as a RAM, a flash memory, a ROM, a programmable ROM or electrically erasable programmable ROM and a register. The storage medium is located in the memory 420, and the processor 410 reads the information in the memory 420, and completes the steps of the method in combination with hardware. For avoiding repetitions, no more detailed descriptions will be made herein.

Optionally, the transceiver 430 is further configured to, when the mobile terminal is powered on before the first timer expires, keep an EMM-REGISTERED state before powering-off, and send powering-on indication information to the network equipment, wherein the powering-on indication information indicates that the mobile terminal has been powered on such that the network equipment resumes the registration state for the mobile terminal.

Optionally, when the mobile terminal is powered on after performing the detach operation, the processor 410 is further configured to perform an attach operation.

Optionally, the transceiver 430 is further configured to receive first configured time period sent by the network equipment. The first configured time period is a time period which is configured for the second timer by the network equipment. The processor 410 is further configured to set a time period of the first timer as the first configured time period.

Optionally, the transceiver 430 is further configured to receive a plurality of configured time periods sent by the network equipment. The processor 410 is further configured to set a second configured time period of the plurality of configured time periods as the time period of the first timer. The transceiver 430 is further configured to send the second configured time period to the network equipment, such that the network equipment sets a time period of the second timer as the second configured time period.

It is to be understood that the mobile terminal 400 according to the embodiment of the disclosure may correspond to the mobile terminal 200 in the embodiment of the disclosure, and may correspond to the mobile terminal in the method 100) according to the embodiment of the disclosure, and the abovementioned and other operations and/or functions of each module in the mobile terminal 400 are intended to implement corresponding flows of the mobile terminal in the method in FIG. 1, and will not be elaborated herein for briefness.

Therefore, when the mobile terminal of the embodiment of the disclosure is powered off, the first timer is started, and the detach operation is temporarily not performed. If the mobile terminal is powered on again when the timer hasn't expired, an attach operation is not required to be performed. If the mobile terminal is not powered on again when the timer expires, the mobile terminal and the network equipment may perform the detach operation when the timer expires. In such a manner, a signaling overhead of an attach/detach flow may be effectively reduced, particularly for a service such as V2X relatively frequently executing the attach/detach operation, system efficiency may also be improved, and a first access delay of the mobile terminal may be reduced.

Figure 5:
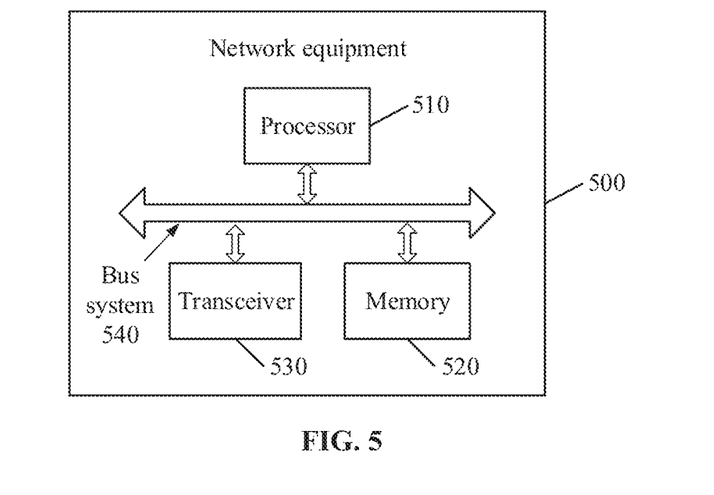
FIG. 5 is a schematic block diagram of a core network equipment according to another embodiment of the disclosure.

As illustrated in FIG. 5, an embodiment of the disclosure further provides network equipment 500. The network equipment 500 includes a processor 510, a memory 520, a transceiver 530 and a bus system 540, wherein the processor 510, the memory 520 and the transceiver 530 are connected through the bus system 540, the memory 520 is configured to store an instruction, and the processor 510 is configured to perform the instruction stored in the memory 520 to control the transceiver 530 to receive and transmit a signal, wherein the processor 510 is configured to, when the transceiver 530 receives powering-off indication information sent by a mobile terminal, start a second timer, wherein the powering-off indication information indicates that the mobile terminal has been powered off, the second timer performs timing synchronously with timing of a first timer in the mobile terminal and the first timer is started upon the mobile terminal is powered off; and when the transceiver 530 has still yet not received powering-on indication information sent by the mobile terminal in case of a timeout of the second timer, perform a detach operation, wherein the powering-on indication information indicates that the mobile terminal has been powered on.

Therefore, according to the network equipment of the embodiment of the disclosure, when the mobile terminal is powered off, the first timer is started, and the detach operation is temporarily not performed. If the mobile terminal is powered on again when the timer hasn't expired, an attach operation is not required to be performed. If the mobile terminal is not powered on again when the timer expires, the mobile terminal and the network equipment may perform the detach operation when the timer expires. In such a manner, a signaling overhead of an attach/detach flow may be effectively reduced, particularly for a service such as V2X relatively frequently executing the attach/detach operation, system efficiency may also be improved, and a first access delay of the mobile terminal may be reduced.

It is to be understood that, in the embodiment of the disclosure, the processor 510 may be a CPU, and the processor 510 may also be another universal processor, a DSP, an ASIC, an FPGA or another programmable logic device, discrete gate or transistor logical device and discrete hardware component. The universal processor may be a microprocessor or the processor may also be any conventional processor and the like.

The memory 520 may include a ROM and a RAM, and provides an instruction and data for the processor 510. Part of the memory 520 may also include a nonvolatile RAM. For example, the memory 520 may further store information about an equipment type.

The bus system 540 includes a data bus, and may further include a power bus, a control bus and a state signal bus. However, for clear description, each bus in the figure is marked to be the bus system 540.

In an implementation process, each step of the method may be implemented by an integrated logic circuit of hardware in the processor 510 or an instruction in a software form. The steps of the method disclosed in combination with the embodiment of the disclosure may be directly embodied to be performed and implemented by a hardware processor or executed and implemented by combining hardware and software modules in the processor. The software module may be located in a mature storage medium in this field such as a RAM, a flash memory, a ROM, a programmable ROM or electrically erasable programmable ROM and a register. The storage medium is located in the memory 520, and the processor 510 reads the information in the memory 520, and completes the steps of the method in combination with hardware. For avoiding repetitions, no more detailed descriptions will be made herein.

Optionally, the processor 510 is further configured to, when the transceiver 530 receives the powering-on indication information sent by the mobile terminal in case of no timeout of the second timer, keep an EMM-REGISTERED state before powering-off.

Optionally, the processor 510 is further configured to set a time period of the second timer as first configured time period. The transceiver 530 is further configured to send the first configured time period to the mobile terminal such that the mobile terminal sets a time period of the first timer as the first configured time period.

Optionally, the transceiver 530 is further configured to send a plurality of configured time periods to the mobile terminal, and receive a second configured time period of the plurality of configured time periods sent by the mobile terminal. The second configured time period is a time period which is configured for the first timer by the mobile terminal. The processor 510 is further configured to set the time period of the second timer as the second configured time period.

It is to be understood that the network equipment 500 according to the embodiment of the disclosure may correspond to the network equipment 300 in the embodiment of the disclosure, and may correspond to the network equipment in the method 100 according to the embodiment of the disclosure, and the abovementioned and other operations and/or functions of each module in the network equipment 500 are intended to implement corresponding flows of the mobile terminal in the method in FIG. 1, and will not be elaborated herein for briefness.

Therefore, according to the network equipment of the embodiment of the disclosure, when the mobile terminal is powered off the first timer is started, and the detach operation is temporarily not performed. If the mobile terminal is powered on again when the timer hasn't expired, an attach operation is not required to be performed. If the mobile terminal is not powered on again when the timer expires, the mobile terminal and the network equipment may perform the detach operation in case of the timeout of the timer. In such a manner, a signaling overhead of an attach/detach flow may be effectively reduced, particularly for a service such as V2X relatively frequently executing the attach/detach operation, system efficiency may also be improved, and a first access delay of the mobile terminal may be reduced.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Those skilled in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments for convenient and brief description and will not be elaborated herein.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be omitted or not performed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art or part of the technical solutions may be embodied in form of software product, and the computer software product is stored in a storage medium, including a plurality of instructions configured to enable a piece of computer equipment (which may be a personal computer, a server, network equipment or the like) to perform all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for a mobile terminal detaching, comprising:
when the mobile terminal is powered off, starting a first timer, sending powering-off indication information to a network equipment, and keeping a registration state which is the same as the registration state that the mobile terminal was in before powering-off without performing a detach operation, wherein the powering-off indication information indicates that the mobile terminal has been powered off such that the network equipment starts a second timer which is aligned with the first timer; and
when the mobile terminal has not been powered on till the first timer expires, performing, by the mobile terminal, the detach operation.

2. The method as claimed in claim 1, further comprising:
when the mobile terminal is powered on before the first timer expires, keeping, by the mobile terminal, a registration state before powering-off, and sending powering-on indication information to the network equipment, wherein the powering-on indication information indicates that the mobile terminal has been powered on such that the network equipment resumes the registration state for the mobile terminal.

3. The method as claimed in claim 1, wherein when the mobile terminal is powered on after performing the detach operation, the method further comprises:
performing, by the mobile terminal, an attach operation.

4. The method as claimed in claim 1, further comprising:
receiving, by the mobile terminal, a first configured timer sent by the network equipment, wherein the first configured timer is configured based on the second timer; and
configuring, by the mobile terminal, the first timer as the first configured timer.

5. The method as claimed in claim 1, further comprising:
receiving, by the mobile terminal, a set of configured timers sent by the network equipment;
configuring, by the mobile terminal, a second configured timer of the set of configured timers as the first timer; and
sending, by the mobile terminal, the second configured timer to the network equipment such that the network equipment configures the second timer as the second configured timer.

6. The method as claimed in claim 2, wherein when the mobile terminal is powered on after performing the detach operation, the method further comprises:
performing, by the mobile terminal, an attach operation.

7. The method as claimed in claim 2, further comprising:
receiving, by the mobile terminal, a first configured timer sent by the network equipment, wherein the first configured timer is configured based on the second timer; and
configuring, by the mobile terminal, the first timer as the first configured timer.

8. The method as claimed in claim 3, further comprising:
receiving, by the mobile terminal, a first configured timer sent by the network equipment, wherein the first configured timer is configured based on the second timer; and
configuring, by the mobile terminal, the first timer as the first configured timer.

9. The method as claimed in claim 2, further comprising:
receiving, by the mobile terminal, a set of configured timers sent by the network equipment;
configuring, by the mobile terminal, a second configured timer of the set of configured timers as the first timer; and
sending, by the mobile terminal, the second configured timer to the network equipment such that the network equipment configures the second timer as the second configured timer.

10. The method as claimed in claim 3, further comprising:
receiving, by the mobile terminal, a set of configured timers sent by the network equipment;
configuring, by the mobile terminal, a second configured timer of the set of configured timers as the first timer; and
sending, by the mobile terminal, the second configured timer to the network equipment such that the network equipment configures the second timer as the second configured timer.

11. A method for a mobile terminal detaching, comprising:
when a network equipment receives powering-off indication information sent by the mobile terminal, starting a second timer, and keeping a registration state which is the same as the registration state that the mobile terminal was in before powering-off without performing a detach operation, wherein the powering-off indication information indicates that the mobile terminal has been powered off, the second timer performs timing synchronously with timing of a first timer in the mobile terminal and the first timer is started upon the mobile terminal is powered off; and
when the network equipment has not yet received powering-on indication information sent by the mobile terminal when the second timer expires, performing, by the network equipment, the detach operation, wherein the powering-on indication information indicates that the mobile terminal has been powered on.

12. The method as claimed in claim 11, further comprising:
when the network equipment receives the powering-on indication information sent by the mobile terminal before the second timer expires, keeping, by the network equipment, a registration state before powering-off.

13. The method as claimed in claim 11, further comprising:
configuring, by the network equipment, the second timer as first configured timer; and
sending, by the network equipment, the first configured timer to the mobile terminal such that the mobile terminal sets the first timer as the first configured timer.

14. The method as claimed in claim 11, further comprising:
sending, by the network equipment, a set of configured timers to the mobile terminal;
receiving, by the network equipment, a second configured timer of the set of configured timers sent by the mobile terminal, wherein the second configured timer is configured based on the first timer; and
configuring, by the network equipment, the second timer as the second configured timer.

15. The method as claimed in claim 12, further comprising:
configuring, by the network equipment, the second timer as first configured timer; and
sending, by the network equipment, the first configured timer to the mobile terminal such that the mobile terminal sets the first timer as the first configured timer.

16. A mobile terminal, comprising:
a sending unit configured to, when the mobile terminal is powered off, start a first timer, send powering-off indication information to a network equipment, and keep a registration state which is the same as the registration state that the mobile terminal was in before powering-off without performing a detach operation, wherein the powering-off indication information indicates that the mobile terminal has been powered off such that the network equipment starts a second timer which is aligned with the first timer; and
a processing unit configured to, when the mobile terminal has not been powered on till the first timer expires, perform the detach operation.

17. The mobile terminal as claimed in claim 16, wherein the sending unit is further configured to
when the mobile terminal is powered on before the first timer expires, keep a registration state before powering-off, and send powering-on indication information to the network equipment, wherein the powering-on indication information indicates that the mobile terminal has been powered on such that the network equipment resumes the registration state for the mobile terminal.

18. The mobile terminal as claimed in claim 16, further comprising:
a receiving unit configured to receive a first configured timer sent by the network equipment, wherein the first configured timer is configured based on the second time,
wherein the processing unit is further configured to set the first timer as the first configured timer.

19. The mobile terminal as claimed in claim 16, further comprising:
a receiving unit configured to receive a set of configured timers sent by the network equipment, wherein
the processing unit is further configured to set a second configured timer of the set of configured timers as the time period of the first timer; and
the sending unit is further configured to send the second configured timer to the network equipment such that the network equipment configures the second timer as the second configured timer.

20. The method as claimed in claim 1, wherein when the power of the mobile terminal is turned off and the mobile terminal has not perform the detach operation, the method further comprises:
keeping, by the mobile terminal, context information during attach.

\* \* \* \* \*